INVENTORS
JOHN LEROY HORTON
ARTHUR BAYARD CONARD, JR
RICHARD FRANCIS McCORMICK

BY *William A. Drucker*

ATTORNEY

United States Patent Office 3,116,136
Patented Dec. 31, 1963

3,116,136
GAS DRYING AND SEPARATION
John Leroy Horton, Arthur Bayard Conard, Jr., and Richard Francis McCormick, all of Shreveport, La., assignors to The American Machine & Foundry Co., a corporation of New Jersey
Filed Nov. 1, 1960, Ser. No. 66,467
2 Claims. (Cl. 62—20)

This invention relates to the treatment of rich natural gas vapor for the purpose of dehydrating the gas and extracting condensed hydrocarbon liquids, and more particularly this invention relates to an improved process and apparatus for dehydrating natural gas and condensing out liquid components thereof employing mechanical refrigeration.

It is a principal object of the present invention to provide an improved and more efficient process and apparatus for dehydrating natural gas and for recovering condensable liquid hydrocarbons therefrom, the invention being particularly useful at the actual well site and requiring only the expending of a minimum amount of energy in order to maintain the operation at an economical level.

There are a number of prior art systems for extracting condensable hydrocarbons from a vaporous mixture flowing through the apparatus at moderate pressure, and for removing water vapor from the mixture. Such processes frequently involve the passing of the gas through heat exchanger means to cool the gas so that the heavier components thereof will enter the liquid phase and can be easily recovered. When the mixture containing water vapor is subjected to such treatment, the water tends to condense so that the gas becomes dehydrated, but such dehydration is truly effective for purposes of transportation of the gas only if it is complete enough that no water will condense out of the gas when it is transported through pipe lines. For this purpose the gas must be chilled to a water content less than seven pounds per million cubic feet. However, at such low temperatures difficulties are encountered because natural gas hydrates are deposited on the heat exchange surfaces and decrease their efficiency, and in time may even choke the flow of gas through the equipment and/or prevent its contact with the heat exchange surfaces. To prevent such freezing and forming of hydrates, the gas, according to these prior art methods, has been partially dehydrated by absorption or adsorption before the gas is subjected to heat exchange at low temperatures, i.e., below the freezing point of water. These methods of dehydration also involve undesirable drawbacks since liquefiable hydrocarbons contaminate the absorption or adsorption medium with the result that these hydrocarbons are lost and/or prevent easy regeneration of the dehydrating medium.

Other methods of preventing "freezeups" and formation of hydrates include the addition of antifreeze to the gas before refrigeration thereof. In prior art disclosures where antifreeze is added to the mixture it has been necessary for economical operation of the process to recover the antifreeze, particularly if it is glycol, since it is an expensive additive. An example of a prior art system employing antifreeze and requiring the recovery of the antifreeze, for example is disclosed in U.S. Patent 2,715,945 to Hankison et al.

It is another principal object of this invention to provide a process and apparatus for the dehydration of a wet gas mixture and for the extraction of liquid hydrocarbons therefrom wherein the mixture is first cooled to some temperature slightly above that at which gas hydrates form. The water which condenses out during this first stage of cooling is then removed. In this stage, a rather high percentage of the water vapor will have been removed from the gas, and therefore only a small amount of antifreeze is necessary to prevent formation of ice or hydrates on the heat exchange surfaces in subsequent stages employing much lower temperatures. For instance, satisfactory operation has been found to take place when the final stage of condensation is maintained within the range of zero degrees to minus 20 degrees Fahrenheit. In a working field unit of the present apparatus, freeze-up was prevented by the introduction of only four gallons of methanol per day when the apparatus was processing five hundred thousand standard cubic feet per day of wet gas mixture fed thereinto, the mixture being saturated with about one thousand pounds of water per million standard cubic feet and entering the apparatus at about 130° F. In view of the small amount of methanol required for the processing of so large a volume of gas, the present process needs no provision for the recovery of the methanol, which can be simply written off as an operating cost.

It is still another important object of the present invention to provide at least one stage of pre-cooling prior to entry of the vaporous mixture into the refrigerated low-temperature heat exchanger stage so that the refrigeration load required to recover a given amount of condensate is reduced far below what would be required if the entire wet gas mixture had to be chilled with direct refrigeration only. By pre-cooling the wet stream of gas to a temperature as close to the hydrate point as possible, but thereabove, the water vapor which the gas stream initially carried at temperatures higher than this point is separated out, leaving only a small quantity of water in the gas stream, and therefore necessitating the removal of only a relatively smaller amount of heat by refrigeration, and the adding of only a small quantity of antifreeze when the remaining gas is to be chilled below the hydrate point. This feature eliminates the use of a glycol system requiring either the recovery of the glycol or the removal of water from the glycol stream by the application of heat as shown in the above-mentioned Patent 2,715,945 to Hankison et al.

It is a major object of this invention to provide a process and apparatus which takes maximum advantage of various types of cooling which are available. According to the present system, in the first stage inexpensive water cooling is employed down to as low a temperature as possible, approximately 90° F. for a system employing evaporative cooling of the water under fairly adverse circumstances. In the next stage cold liquids and vapors are regeneratively fed back from the final stage to absorb additional heat in the second stage heat exchangers. Finally, mechanical refrigeration is applied to accomplish the remaining cooling of the gas stream which by now has decreased greatly in volume and has had most of the hydrocarbon condensate formed and its moisture removed. Since the major cost of the entire system is found in the refrigerating equipment, lower costs result both by virtue of the fact that smaller and less expensive refrigerating apparatus is required, and also by virtue of the fact that less power is consumed in refrigerating the decreased gas volume.

A further important object of this invention is to provide a process in which the cold gases and liquids from the final heat exchanger stage are kept separate when regeneratively fed back to the second stage heat exchange means so that subsequent further processing of the liquid components is facilitated. The output gas component is fed through one heat exchange means of the second stage to chill the wet mixture passing therethrough, and the liquid components are fed through a separate second-stage heat exchange means to contribute partially to the chilling of the wet mixture stream. The gas mixture streams from both of the second stage heat exchange means are then re-combined and passed through a water knockout to separate out condenser water from the hydrocarbons.

A further important object of the invention is to provide a device in which in all of the heat exchangers in the paths carrying the wet gas mixture, the gaseous and liquid hydrocarbons occupy the same paths so as to present a continuous gas-liquid interface contact of the hydrocarbon liquids and the vapors carried in the stream, this continuous contact having the advantage of permitting partial absorption of the vapors in the liquid stream throughout the process.

Other objects and advantages of the invention will become apparent from the following discussion of the drawings, wherein.

Figure 1:
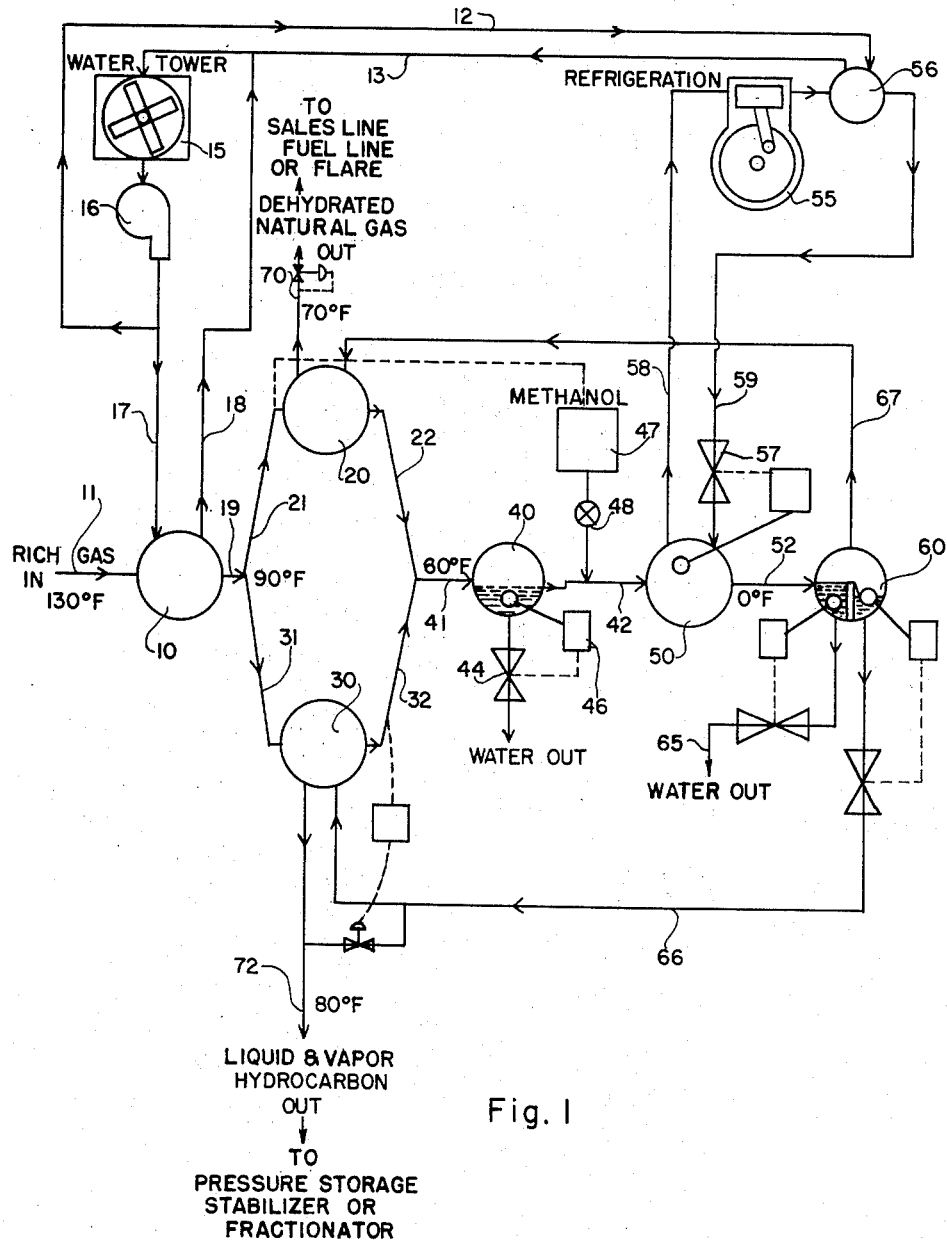
FIG. 1 is a flow diagram of the process according to the invention.

Referring now to the drawings, according to the illustrative embodiment of the present invention, the wet gas is initially cooled by employing to best advantage as cheap a coolant as possible, in the present case water cooling. The wet gas is first fed into a water cooled heat exchanger 10, which heat exchanger is cooled by water from an evaporating tower 15. This first stage cooler according to the present process brings the gas down to a temperature of, for example, 90° F. The entire system is operated at a pressure considerably above atmospheric pressure, for instance about 500 pounds per square inch. The cooled gas stream is then split and fed through two heat exchangers 20 and 30 wherein the split stream is cooled by refrigerated gas vapors, which comprise one component of the final output of the system, and also by heavy hydrocarbon liquids which comprise another component of the final output of the system. These output components of gas and liquid are at about zero degrees or less and are therefore able to absorb a considerable amount of heat from the streams of gas flowing through the exchangers 20 and 30. The two streams from these heat exchangers are then re-combined and are passed through a water knockout 40 which removes the water initially condensed in the heat exchangers 10, 20 and 30. By this time, the gas stream has been cooled down sufficiently that it has lost a high proportion of the water initially contained therein. As the stream leaves the water knockout 40, a quantity of methanol or other suitable and inexpensive antifreeze is entered into the stream from a tank 47, and then the stream enters a very cold heat exchanger 50, the stream entering at approximately 60° F. and emerging at approximately zero degrees F., or colder. The heat exchanger 50 is cooled by a mechanical refrigeration system including a compressor 55, a condenser 56, an expansion valve 57, and an evaporator comprising one heat exchange path within the heat exchanger 50.

Finally, the stream emerges from the heat exchanger 50 at about 485 pounds per square inch and at approximately zero degrees F., and passes into the three-phase separator 60 which divides the stream into water output at pipe 65, liquid hydrocarbon output at pipe 66, and gaseous output at pipe 67. The gas vapor output travels in pipe 67 to the heat exchanger 20 where it absorbs a considerable amount of heat before passing to the final gas outlet 70. Likewise, the liquid hydrocarbon output 66, also at very low temperature, passes through the heat exchanger 30 where it also absorbs considerable heat from the gas stream passing therethrough before passing out through the liquid hydrocarbon outlet 72 of the system.

As stated above, it is an important feature of the present process that as much water vapor as possible is initially removed from the vaporous mixture by using a cheap coolant, such as water, and by regenerative use of the cold output components of the system. When the maximum use has been made of these coolants, an inexpensive antifreeze is then added to the gas stream before final chilling thereof to prevent freezing of the remaining hydrates during the subsequent mechanical refrigeration of the mixture in the heat exchanger 50.

In the portion of this specification reciting the objects of the invention, it was stated that four gallons of methanol per day would be sufficient when introduced in the present system assuming that the system was passing approximately one-half million standard cubic feet of gas per day. This is such a small quantity of methanol that it can be economically permitted to pass out of the system with no effort made to receive the antifreeze, the cost thereof merely being written off as an operating expense.

Figure 2:
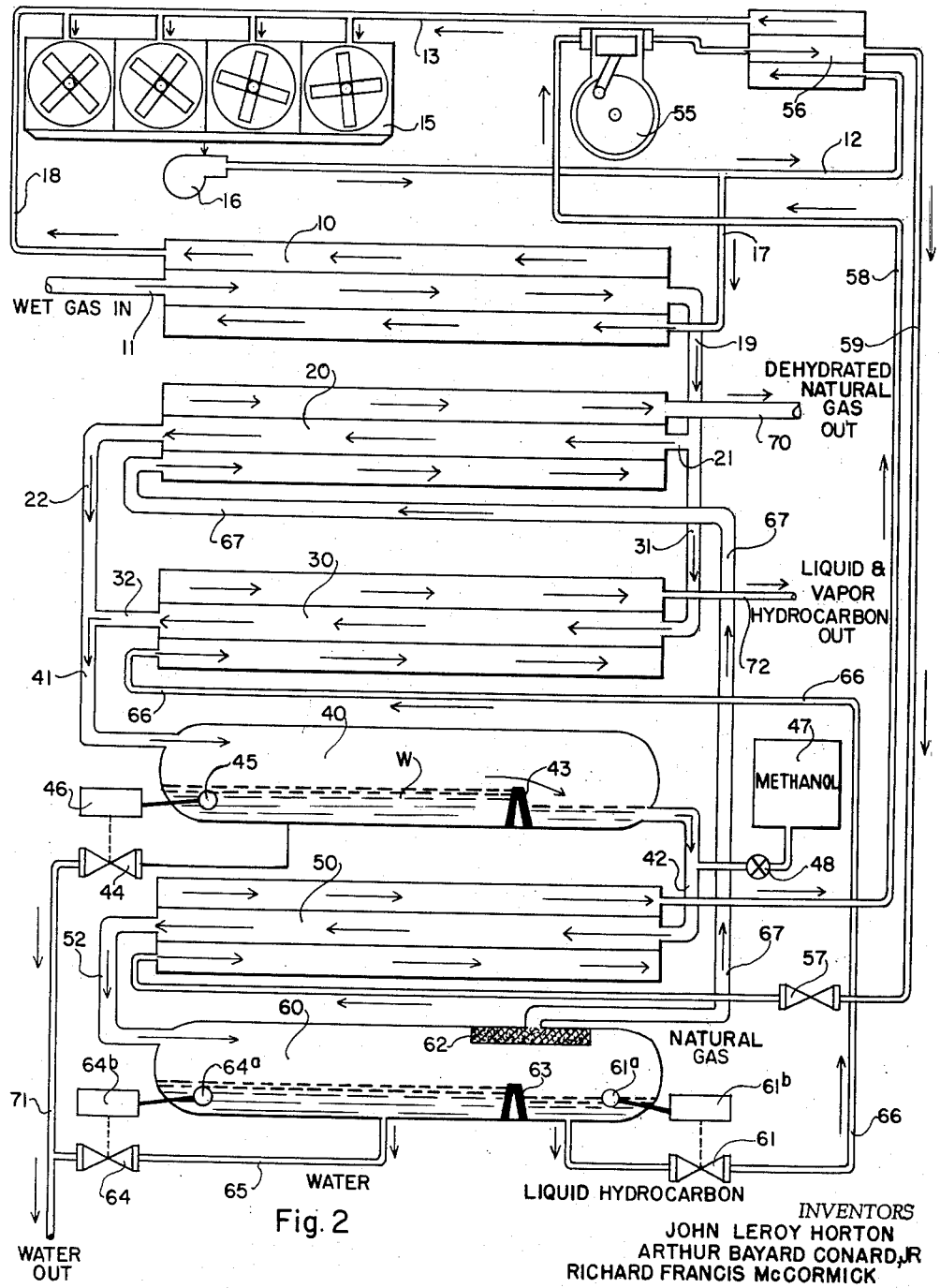
FIG. 2 is a diagrammatic representation illustrating an embodiment of the apparatus according to the invention.

Referring particularly to FIG. 2, this figure shows units similar to those described schematically in connection with FIG. 1, the wet gas being fed into the input 11 and passed through the heat exchanger 10, which heat exchanger has coolant water fed from the evaporative cooler 15 through a water pump 16 and through the pipe 17 into the heat exchanger, the water being returned from the heat exchanger of the evaporating tower 15 by way of a line 18.

The water pump 16 also furnishes cooled water through the line 12 into the condenser 56 for cooling the compressed gas in the refrigeration system, the condenser 56 immediately following the compressor 55. The heated water from the condenser 56 is returned to the evaporative cooling tower 15 by the line 13.

The water-cooled heat exchanger 10 reduces the temperature of the main gas stream entering thereinto through the input 11 and discharges the gas stream plus whatever liquids may have condensed therefrom through the output pipe 19, pipe lines 21 and 31 in parallel and then conducts the cooled stream into heat exchangers 20 and 30. The heat exchange in the exchanger 20 takes place between the mixture entering the exchanger 20 through the pipe 21 and the cold gases entering through the pipe 67 and coming from the mechanically refrigerated heat exchanger 50 at a temperature about or below zero degrees F. These cold gases absorb heat from the mixture entering through the pipe 21 and are warmed thereby and leave the heat exchanger through the dehydrated gas output 70 from which they can be introduced into a gas main, used as dry fuel or flared. The gas stream, entering through the pipe 21, after being cooled by heat exchange with the cold gases flowing through the pipe 67 then passes outwardly through the pipe 22 in the form of partially cooled vapor and an increased quantity of condensate which also leaves the heat exchanger 20 through the pipe 22 and passes downwardly into the water knockout 40 through the pipe 41.

Likewise, in the heat exchanger 30 the stream of gases and liquids entering through the pipe 31 is further cooled in heat exchange relationship with the heavy liquid hydrocarbons entering the exchanger from the pipe 66 at a low temperature, approximating zero degrees F. Still further condensation takes place in the center channel of the heat exchanger 30 and both the gases and liquids pass outwardly through the pipe 32 and into the pipe 41 and eventually into the water knockout 40.

It is to be particularly noted that the liquid-vapor interface is deliberately preserved in all heat exchangers and in the pipes joining these exchangers for partial absorption action throughout the process.

The water knockout 40 includes a weir 43 which collects water W to the left of the weir but permits the passage of the gaseous hydrocarbons into the discharge pipe 42 along with the liquid hydrocarbon component passing over the weir 43, which components are then passed through the pipe 42, methanol is injected, and are then passed into the refrigerated heat exchanger 50. The level of the water in the knock-out 40 is maintained by a valve 44 controlled by a float 45 through a differential liquid level controller 46. The valve 44 is throttled open when the water W exceeds a certain level so as to prevent a water level build up, and the discharge water then passes outwardly through a water pipe 71. As stated above, the methanol is injected by gas head pressure from the methanol tank 47 through a micro valve 48 which meters the rate at which the methanol enters the system at the pipe 42.

The refrigeration system lowers the temperature of the heat exchanger 50 to a value below the hydrate temperature of the wet gas stream. However, the methanol prevents freezing within the heat exchanger 50 and thereby assists the cold vapors and condensates to leave the heat exchanger 50 through the pipe 52 and enter the three-phase separator 60, as will be described hereinafter. The outer jacket of the heat exchanger 50 as illustrated in FIG. 2 represents the evaporator of the refrigeration system, the compressed refrigerant is expanded and cooled by the valve 57 and the refrigerant then absorbs heat from the stream passing through the center duct of the heat exchanger 50. The refrigerant then passes onto the compressor 55 where it is compressed and then cooled in the water condenser 56 to return it to the liquid state, the pipe 58 returning the gas to the compressor 55 and the pipe 59 conducting the compressed liquid refrigerant back to the expansion valve 57.

The cold stream of gases and condensed liquids passes downwardly through the pipe 52 and into the three-phase separator 60 which also includes a weir 63. Water collects to the left of the weir and is drawn off through the pipe 65, the level of the water being maintained by the valve 64 which is in turn controlled by a float 64a and a suitable mechanism 64b. On the other side of the weir, the heavy hydrocarbons collect and are drawn off at a rate which is controlled by the valve 61 which is in turn controlled by a float 61a and a mechanism 61b. A filter 62 is disposed across the gaseous outlet from the three-phase separator 60 and the gases pass through this outlet and upwardly through the pipe 67, through the heat exchanger 20 and out through the dehydrated gas discharge 70. The outlet for the heavy hydrocarbons comprises the pipe 72.

Thus, in the present apparatus the gas comes out of pipe 70, the water comes out of pipe 71, and heavy hydrocarbons come out of the pipe 72.

This invention is not to be limited to the exact form shown in the drawings, for obviously changes may be made therein.

What is claimed is:

1. The method of treating a vaporous mixture of hydrocarbons and water to separate the mixture at low temperature into water, gaseous hydrocarbon components and liquid hydrocarbon components including the steps of:
   (a) evaporatively cooling a body of water;
   (b) cooling the mixture by heat exchange with said cool water;
   (c) passing the mixture into indirect heat-exchange relation with coolant paths for cooling the mixture to a temperature near to but above the hydrate temperature;
   (d) removing the water condensed from the mixture at this latter temperature;
   (e) introducing an antifreeze in sufficient quantity to prevent freezing of the water vapor remaining in the mixture at said low temperature;
   (f) mechanically compressing a refrigerant, cooling it by heat exchange with said body of water, and expanding the refrigerant in heat-exchange relation with the remainder of the mixture to cool the latter below said hydrate point to said low temperature;
   (g) separating the gaseous components and the condensed liquid components; and
   (h) separately recirculating the respective components in said coolant paths.

2. Apparatus for drying and separating a vaporous mixture of water and hydrocarbons into gaseous and liquid components comprising
   (a) evaporative means for cooling a body of water;
   (b) indirect cooler means connected to receive said water and said mixture for reducing the temperature of the mixture and liquefying some of the components;
   (c) heat exchange means connected to said cooler means to receive the remaining mixture and said components and having coolant paths, said heat exchange means cooling the components to just above the hydrate temperature;
   (d) water knockout means connected to said heat exchange means to receive said components and to remove condensed water therefrom;
   (e) a low-temperature heat exchanger connected by a conduit to said knockout;
   (f) a source of antifreeze;
   (g) valve means coupling the source to the conduit to introduce antifreeze into the mixture at a rate sufficient to prevent freezing of the water vapor remaining therein;
   (h) heat-pump refrigeration means including in series compressor means, condenser means and expander means, the condenser means being connected with the evaporative means to be cooled by said body of water, and the expander means being connected with the low-temperature heat exchanger to cool the mixture therein well below said freezing temperature;
   (i) separator means coupled to said heat exchanger and separating the mixture into gaseous components, liquid-hydrocarbon components, and water components; and
   (j) pipe means for connecting the separator means to said coolant paths to pass said gaseous components and said liquid components therethrough.

References Cited in the file of this patent

UNITED STATES PATENTS

| | | |
|---|---|---|
| 2,151,248 | Vaughn | Mar. 21, 1939 |
| 2,209,534 | Moore | July 30, 1940 |
| 2,315,424 | Hill | Mar. 30, 1943 |
| 2,495,549 | Roberts | Jan. 24, 1950 |
| 2,522,787 | Hughes | Sept. 19, 1950 |
| 2,565,569 | McCants | Aug. 28, 1951 |
| 2,582,148 | Nelly | Jan. 8, 1952 |
| 2,601,599 | Denning | June 24, 1952 |
| 2,747,002 | Walker | May 22, 1956 |
| 2,784,572 | Wucherer | Mar. 12, 1957 |
| 2,951,347 | Spangler | Sept. 6, 1960 |
| 2,964,913 | Smith | Dec. 20, 1960 |